(12) United States Patent
Patrick

(10) Patent No.: US 6,858,270 B2
(45) Date of Patent: Feb. 22, 2005

(54) LIQUID CRYSTAL IMPRINTING

(75) Inventor: David L. Patrick, Bellingham, WA (US)

(73) Assignee: Western Washington University, Bellingham, WA (US)

( * ) Notice: Subject to any disclaimer, the term of this patent is extended or adjusted under 35 U.S.C. 154(b) by 0 days.

(21) Appl. No.: 10/823,817

(22) Filed: Apr. 14, 2004

(65) Prior Publication Data

US 2004/0191429 A1 Sep. 30, 2004

Related U.S. Application Data

(62) Division of application No. 09/641,450, filed on Aug. 17, 2000, now Pat. No. 6,723,396.
(60) Provisional application No. 60/149,391, filed on Aug. 17, 1999.

(51) Int. Cl.[7] .................................................. G11B 5/66
(52) U.S. Cl. ..................... 428/1.2; 428/402; 427/108; 427/102; 427/165; 427/169; 427/532; 427/547; 427/588; 359/76; 156/104; 156/108
(58) Field of Search ........................ 428/1.2; 427/108, 427/162, 165, 169, 532, 547, 598; 359/76; 156/104, 108

(56) References Cited

U.S. PATENT DOCUMENTS

| | | | | |
|---|---|---|---|---|
| 5,354,499 A | * | 10/1994 | Elliott | 252/299.5 |
| 5,433,857 A | * | 7/1995 | Noble et al. | 210/643 |
| 5,441,639 A | * | 8/1995 | Noble et al. | 210/243 |
| 5,443,753 A | * | 8/1995 | Elliott | 252/299.01 |
| 5,468,519 A | * | 11/1995 | Akiyama et al. | 427/532 |
| 5,595,683 A | * | 1/1997 | Elliott | 252/299.01 |
| 5,833,877 A | * | 11/1998 | Elliott | 252/299.01 |
| 5,843,333 A | * | 12/1998 | Hakemi | 252/299.5 |
| 6,126,855 A | | 10/2000 | Elliott | |
| 6,292,439 B1 | * | 9/2001 | Akiba et al. | 368/84 |
| 6,312,303 B1 | * | 11/2001 | Yaniv et al. | 445/24 |
| 6,525,453 B2 | * | 2/2003 | Cheng et al. | 313/309 |
| 6,723,396 B1 | * | 4/2004 | Patrick | 428/1.2 |

* cited by examiner

Primary Examiner—Leszek B Kiliman
(74) Attorney, Agent, or Firm—Christensen O'Connor Johnson Kindness PLLC

(57) ABSTRACT

Oriented materials and methods for their formation are disclosed. The oriented material is formed by depositing an oriented component from an oriented liquid crystal medium. Oriented materials having multiple layers and methods for their formation are also disclosed.

34 Claims, 9 Drawing Sheets

LIQUID CRYSTAL IMPRINTING

CROSS-REFERENCE TO RELATED APPLICATION

This application is a divisional of U.S. patent application Ser. No. 09/641,450, filed Aug. 17, 2000, now U.S. Pat. No. 6,723,396 which claims the benefit of U.S. Provisional Application No. 60/149,391, filed Aug. 17, 1999, each expressly incorporated herein by reference in its entirety.

FIELD OF THE INVENTION

The present invention relates to a highly ordered material and, more particularly, to a highly ordered material obtained from a liquid crystal medium.

BACKGROUND OF THE INVENTION

Preparation of new materials by directed synthesis at molecular-length scales is the object of much current research in materials science, surface chemistry, and the emerging field of crystal engineering. A guiding principle of these efforts is the concept that rational synthesis using nested levels of structural hierarchy spanning a range of length scales from nanometers to the macroscopic could produce systems with tailored physical and chemical properties. The fundamental premise that underlies this approach is that the properties of a material are substantially determined by the length scales that characterize its structure and organization. Thus, the mechanical properties of nanostructured composites, the electronic properties of semiconductor clusters, the magnetic properties of metallic superlattices, and the solution properties of colloidal suspensions all correlate directly to the nanometer-scale dimensions and structure that characterize these systems. In the past ten years a number of new methods based on nanosynthetic and "crystal engineering" strategies have emerged. However, these methods remain limited both in the range of different types of building blocks that can be used, and in the extent to which molecular- and mesoscopic-scale order can be controlled. Novel approaches are needed to extend synthetic control to include new types of building blocks, for controlling molecular-scale order in thin films and crystals, and for controlling structure over macroscopic length-scales.

Liquid crystal (LC) solvents offer several advantages over conventional liquid media for solution phase synthesis of solid materials. These advantages stem from three characteristics unique to LC fluids: (1) LCs undergo strong directional coupling to solid surfaces; (2) LCs possess anisotropic (direction-dependent) properties, including various transport, optical, and mechanical properties; and (3) long-range orientational order in a LC fluid can be manipulated using an external field. Each of these characteristics can be exploited in different ways to control the structure and organization of a material prepared using LC growth media. The mechanism for controlling order in a given system depends on the type of building block and the pathway to building block aggregation.

A major challenge in the emerging fields of nanostructured materials synthesis and crystal engineering is to devise general fabrication methodologies applicable to a diverse set of fundamental building blocks and capable of producing assemblies in which structure and organization are controlled over a broad range of length scales. Interest in controlled crystallization stems from recognition that many macroscopic chemical and physical properties are determined by the microscopic arrangement of a material's basic chemical components, and by the need to prepare well ordered aggregates from building blocks that do not readily crystallize, such as some proteins. Current approaches rely either on specific intermolecular interactions to produce spontaneous self-organization, anisotropic interactions between the building block and an external field, or on a template of seed crystals or a lyotropic liquid crystal. Most methods suffer from rather severe chemical and physical constraints on the choice of fundamental building block, and the size scale characterizing structure and organization is only partly controlled.

The use of LCs as solvents for controlled crystallization and materials synthesis has not been widely studied. A method for controlling molecular alignment in an organic film through the use of a LC has been reported. See U.S. Pat. No. 5,468,519, entitled "Method For Forming an Orientation Film Including Coupling an Organic Compound to a Silane Coupling Agent in a Magnetic or Electrical Field". This patent states that films formed by the method would be useful anchoring layers in LC-based optoelectronic devices.

Polymers are the only major class of materials at have been studied with thermotropic LCs. Some polymers, such as KEVLAR and spider silk, are thought to pass through a LC phase while curing. The resulting framework of partially oriented chains imparts various desirable properties. Partly for this reason a variety of methods have been developed to incorporate LC behavior into polymers. The most important class of these systems is liquid crystal polymers (LCP), which are synthetic polymers consisting of a flexible backbone to which small LC monomers are periodically attached. The monomers may be calamitic or discotic, and may be attached to the backbone by a linker or may be incorporated into the backbone itself. LCPs have been studied as melts, and as solutions in LC solvents. Oriented polymer materials may be formed by curing from a LC phase. Macroscopic alignment can be achieved by poling with an external alignment field. Polymer-stabilized LCs are a related system consisting of an open polymer framework filled by a LC fluid. These systems are being explored for use in LC display devices because they provide high optical contrast and they are relatively insensitive to mechanical stress and domain formation. During manufacture, polymerization to form the framework is carried out using a LC solvent in an external alignment field, resulting in partial alignment of the polymer precursors. After curing memory of the original alignment is retained by the composite. Chiral nematic solvents have also been used, although less commonly. A recent example is the polymerization of acetylene in a chiral nematic environment that resulted in helical strands whose handedness (clockwise or counterclockwise) was determined by the LC.

Several existing nanosynthetic approaches involve lyotropic liquid crystals. In one method, referred to as LC-templating (LCT), a tropic LC provides an organized scaffolding promoting condensation of an inorganic building block to form a (three-dimensional) ceramic-like framework. Inorganic precursors remain confined to the aqueous environment of the surfactant/water mixture and interact with the polar surfactant headgroups through coulombic or hydrogen-bonding forces. After condensation the organic framework may be removed, leaving a mesoporous material whose structure, pore size, and symmetry are determined by the LC scaffolding. This general approach has been creatively applied to produce several new types of nanostructured inorganic material, the most notable example perhaps being the synthesis of the M41S family of mesoporous sieves. LCT has also been used to prepare nanostructured metal clusters and patterned metallic films. These syntheses almost always result in polycrystalline materials with small grain sizes (~μm scale).

There is growing interest in the fabrication of highly ordered molecular films for a range of applications, and considerable effort has been invested in the molecular design, synthesis, and characterization of crystalline films with targeted properties. However, a major limitation to constructing useful devices based on molecular materials, and to obtaining a better understanding of the properties of molecular solids, is that most organic compounds of interest yield polycrystalline films with random or partially random domain orientation. Numerous applications, ranging from molecular electronics and photonics to protein crystallography would benefit from a general method for growing films with uniform alignment.

Despite the advances noted above, there remains a need for highly ordered materials that can be readily formed. A need also exists for a method for readily forming a highly ordered material. The present invention seeks to fulfill these needs and provides further related advantages.

SUMMARY OF THE INVENTION

The present invention provides highly ordered materials and methods for their formation. The method is compatible with a wide variety of fundamental building blocks and can therefore provide a variety of highly ordered materials including molecular films. The method provides oriented materials that can have uniform structure and organization spanning from molecular to macroscopic dimensions. The method includes the use of an oriented liquid crystal medium from which is deposited an oriented component to provide an oriented material.

In one aspect, the invention provides a method for forming an oriented material. In the method, a component is deposited from an oriented liquid crystal medium containing the component to provide the oriented material. In the oriented medium, the component is orientationally ordered, which results in the deposited component being oriented. In one embodiment, the oriented material is formed using a thermotropic liquid crystal solvent, which provides an anisotropic medium that can communicate the influence of an external alignment field to a component in the liquid crystal medium. The oriented component is ultimately deposited from the oriented, component-containing liquid crystal medium to provide the oriented material. The liquid crystal solvent allows for orientational control over the solute, even if the solute does not interact directly with the field.

In another aspect of the invention, oriented materials are provided. In one embodiment, the oriented material is a film. The film can be a monolayer film or, alternatively, the film can include more than one layer. For embodiments that include more than one layer, each layer can be selectively oriented. For multilayered oriented materials, each layer can also include different components.

In further aspects, the invention provides methods for using and devices that include the oriented materials formed in accordance with the present invention.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
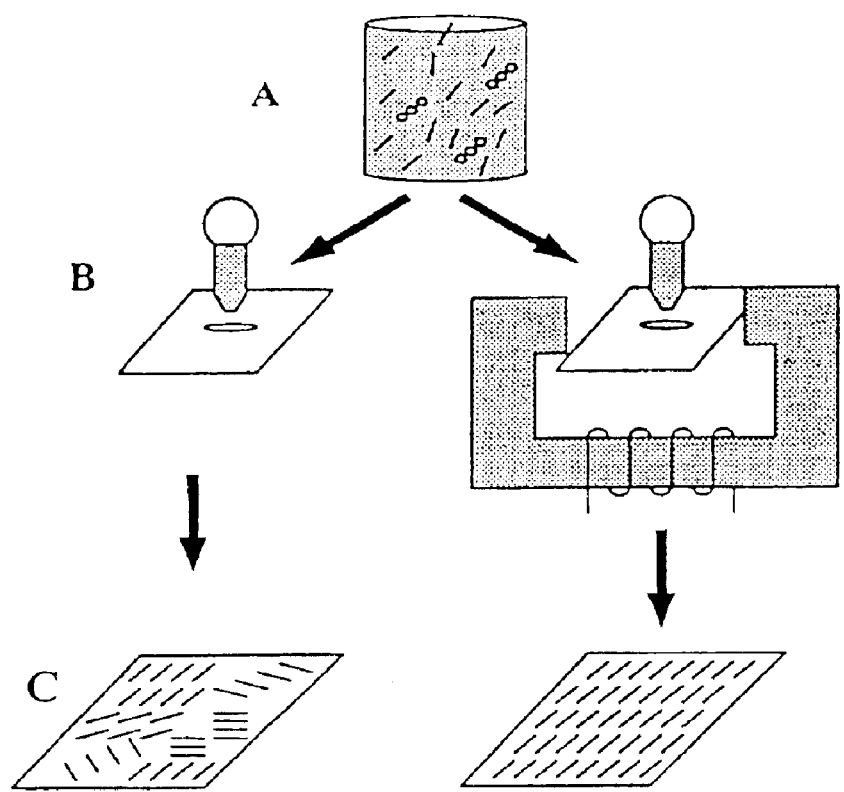
FIG. 1 is a schematic illustration of liquid crystal imprinting.

The present invention provides highly ordered materials and methods for their formation. The method is compatible with a wide variety of fundamental building blocks and can therefore provide a variety of highly ordered materials including molecular films. The method provides oriented materials that can have uniform structure and organization spanning from molecular to macroscopic dimensions. The method includes the use of an oriented liquid crystal medium from which is deposited an oriented component to provide an oriented material.

As used herein, the terms "highly ordered", "orientationally ordered" and "oriented" are used interchangeably and refer to a material in which at least one of its constituent components exhibit substantial uniaxial alignment.

In one aspect, the invention provides a method for forming an oriented material. In the method, a component is deposited from an oriented liquid crystal medium containing the component to provide the oriented material. In the oriented medium, the component is orientationally ordered. This ordering in the liquid crystal medium results in the component being deposited on a substrate maintaining the orientational order of the medium.

The liquid crystal medium can be oriented by any external influence causing alignment of the LC medium. Representative methods include a magnetic field, an electric field, the use of an alignment layer on a surface in contact with the LC medium, shearing the LC medium, or causing the medium to flow.

In one embodiment, the oriented material is formed using a thermotropic liquid crystal solvent, which provides an anisotropic medium that can communicate the influence of an external alignment field to a component (e.g., small organic molecule) in the liquid crystal medium. The oriented component is ultimately deposited (e.g., as a film) from the oriented, component-containing liquid crystal medium to provide the oriented material. The liquid crystal solvent allows for orientational control over the solute (i.e., building block), even if the solute does not interact directly with the field.

Suitable liquid crystal solvents include pure materials, such as 4'-octyl-4-cyanobiphenyl and 4-methoxybenzylidene-4-butylaniline, as well as LC mixtures, such as ZLI-1565 and ZLI-2116 (commercially available from Merck).

Suitable components or building blocks include small organic molecules that can act as solutes in the liquid crystal solvent. Other suitable components include macromolecular structures including polymers. Suitable components also include particles having sizes in the ranges from nanometers to microns. Representative particles include carbon nanotubes and other fullerenes; fibers and whiskers composed of materials such as SiC and carbon; inorganic particles, such as semiconductor and metallic clusters; microtubules; viral particles; nucleic acid polymers (DNA); and organic particles, such as polystyrene spheres.

The liquid crystal medium (i.e., the liquid crystal and component to be deposited) need not be a true solution. The liquid crystal medium can be a mixture or suspension of a liquid crystal and a component to be deposited. The liquid crystal medium need only be capable of providing a medium in which the component to be deposited can be orientationally oriented. The liquid crystal medium can include more than one liquid crystal. The liquid crystal medium can include more than one component to be deposited.

In addition to a method for preparing an oriented material having a single oriented layer, the present invention provides methods for forming materials having more than one layer (i.e., multiple layers) with at least one of the layers being oriented. For materials that include more than one layer, additional layers are formed by the sequential deposition of a component onto the surface of the previously deposited layer. The additional layers can be oriented as described herein or, alternatively, can be randomly oriented.

In general, the invention provides a method for forming an oriented material. The method includes obtaining a liquid crystal medium that includes comprising a liquid crystal solvent and an orientationally orderable component; contacting the liquid crystal medium with a surface for receiving the orderable component; applying an influence to the liquid crystal medium to provide an oriented liquid crystal medium, with the orderable component being orientationally ordered in the oriented medium; and depositing the orientationally ordered component onto the surface to provide the oriented material.

In one embodiment, the invention provides a method for forming an oriented material in which an oriented component is deposited from an oriented liquid crystal medium onto a substrate. As used herein, the term "substrate" refers to a material having a surface for receiving a component deposited from a medium, such as an oriented component deposited from a liquid crystal medium. The substrate can have a variety surfaces. For example, the substrate can have a surface that does not include a deposited material (e.g., a graphite, glass, metal, or plastic surface). Alternatively, the substrate can have a surface that does include one or more layers of materials, including deposited materials.

In others embodiments, the invention provides methods for forming an oriented material having at least two layers. In one method, a first oriented component is deposited from a first oriented liquid crystal medium onto a substrate to provide a first oriented layer followed by depositing a second oriented component from a second oriented liquid crystal medium onto the first oriented layer to provide a second oriented layer adsorbed onto the first layer. In another embodiment, an oriented component is deposited from an oriented liquid crystal medium onto a substrate to provide an oriented layer followed by depositing a second component from a liquid crystal medium onto the oriented layer to provide a second layer adsorbed onto the first layer. The second layer can include materials that are randomly oriented. In a further embodiment, a first component is deposited from a liquid crystal medium onto a substrate to provide a first layer followed by depositing an oriented component from an oriented liquid crystal medium onto the first layer to provide an oriented layer adsorbed onto the first layer. The first layer can include materials that are randomly oriented.

In another embodiment, the invention provides a method for forming a material having a plurality of layers in which at least one of the layers is an oriented layer. In the method, a first component is deposited from a first liquid crystal medium onto a substrate to provide a first layer followed by sequentially depositing successive components from successive liquid crystal media to provide successive layers. Each successive layer is adsorbed onto the previously deposited layer. In this embodiment, at least one layer is an oriented layer formed by depositing an oriented component from an oriented liquid crystal medium.

It will be appreciated that multilayered materials having one or more oriented layers includes materials in which the oriented layer includes an oriented component having a selected but variable orientation throughout the thickness of the oriented layer. Such a layer can be prepared by varying the orientation of a liquid crystal medium during the deposition of an oriented component contained within the medium. For example, by rotating the orientation of the liquid crystal medium (by, for example, rotating the applied magnetic field) an oriented layer can be formed in which the oriented component in the layer has varying orientations (e.g., a helical configuration). It will be appreciated that other orientation configurations can be readily obtained by varying the orientation of the liquid crystal medium from which a component is deposited and that all such configurations are within the scope of the invention.

In another aspect of the invention, oriented materials are provided. In one embodiment, the oriented material is a film. Such a film can be a macroscopically uniaxial molecular film. The film can be a monolayer film. Alternatively, the film can include more than one layer. For embodiments that include more than one layer, each layer can be selectively oriented. For multilayered oriented materials, each layer can also include different components. Materials having, in addition to an oriented layer, a randomly oriented layer are also provided by the invention.

In one embodiment, the present invention provides a thin film in which orientational order is controlled. In one embodiment, the thin film is a monolayer film. The film is formed using building blocks of small organic molecules soluble in a thermotropic LC solvent. When a quantity of a molecular solute (i.e., the building block) is dissolved in the LC, nematic order can be imprinted on the monolayer deposited onto a solid substrate. In the presence of an external influence causing alignment of the LC medium, the monolayer film develops orientational order over molecular to macroscopic length scales.

In one embodiment, the invention provides a material having at least one oriented layer in which the oriented layer is formed by depositing an oriented component from an oriented liquid crystal medium.

In another embodiment, the invention provides a multi-layered material having at least one oriented layer in which the oriented layer or layers are formed by depositing an oriented component from an oriented liquid crystal medium.

The above process is referred to as liquid crystal imprinting (LCI). The LCI process is illustrated schematically in FIG. 1. Referring to FIG. 1, a solution (or mixture) containing a solute in a LC solvent is prepared (A) and applied to a substrate in the presence of an external field (B). Solute molecules deposited from the mixture form a film in which molecular order is controlled by the orientation of the field and deposition in the absence of an external field (left-hand side) results in a film with macroscopically random orientation (C).

Figure 2:
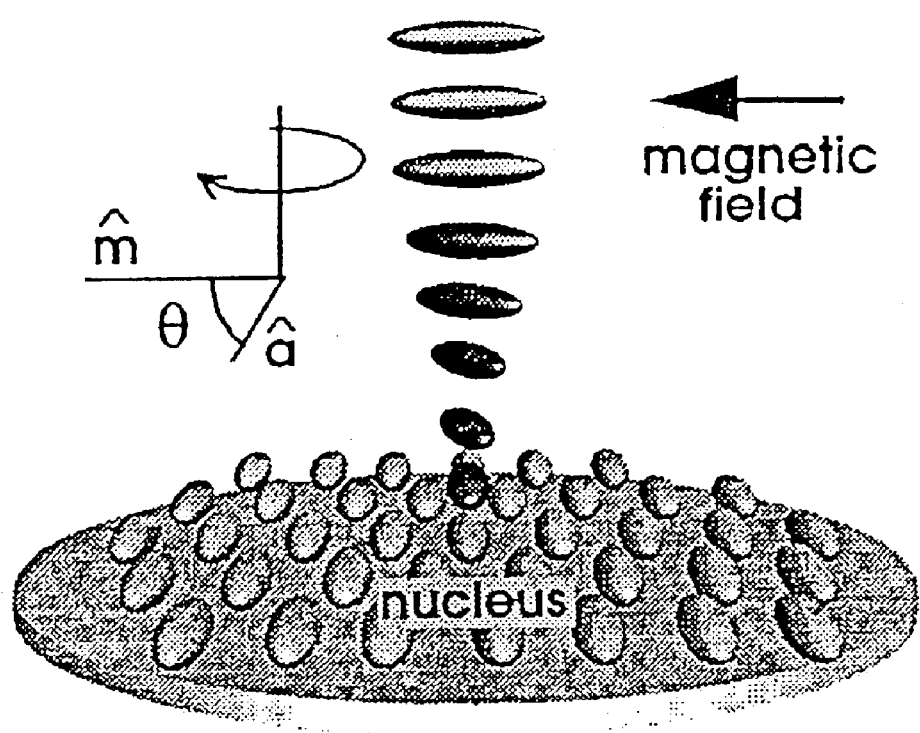
FIG. 2 is a schematic illustration of the effect of a magnetic field on nuclei and anchoring.

LCI alignment is based on LC anchoring interactions. In a film forming at a LC interface, these interactions exert a small torque on nuclei whose orientation differs from the orientation of the interfacial nematic director. If the director is fixed by an external field, nuclei reorient to align themselves parallel to it. The origin of this torque is illustrated in FIG. 2. Referring to FIG. 2, if the anchoring direction a above a nucleus differs from the bulk director established by the field m, a twist distortion occurs at the interface, increasing the system's orientational energy. By rotating through an angle $\theta$ the nucleus minimizes this energy. At most interfaces LCs tend to adopt a preferred orientation-the anchoring direction. If the anchoring direction above a nucleus differs from the director orientation in the bulk imposed by the external influence causing alignment of the LC medium, strain energy is stored in the fluid as a distortion in the director, and a quasi-elastic torque is exerted on the nucleus. For planar anchoring, a misaligned nucleus leads to a twist distortion, as shown in FIG. 2. A nucleus developing under these conditions experiences an energetic incentive to orient in a manner that minimizes strain energy by rotating to match the nucleus' anchoring direction with that imposed by the field.

For nuclei forming on isotropic substrates; such as at an air/LC interface or at a liquid/LC interface, an alignment energy as small as ~1 kT would be sufficient to produce films of highly uniform orientation. However for nuclei forming on anisotropic substrates, such as on the surface of a crystal, the alignment energy will normally be much smaller than adsorbate-substrate interactions. In this case the role of LC anchoring is to remove or reduce any substrate orientational degeneracy, causing nuclei to select the substrate lattice direction nearest the direction that minimizes the strain energy.

For example, one system examined consisted of a monolayer film of the fatty acid $C_{23}H_{47}COOH$ (tetracosanoic acid, TA) deposited from a thermotropic LC solvent onto graphite. Tetracosanoic acid forms a commensurate, polycrystalline film with the molecular axis lying in the graphite plane oriented along one of the principle graphite lattice vectors. Although molecule-substrate interactions are very strong and anisotropic in this system, it was nevertheless possible to produce uniformly oriented monolayers when films were deposited in an external influence causing alignment of the LC medium. Anchoring interactions effectively eliminated the three-fold orientational degeneracy of the substrate by making it much more favorable for nuclei to orient along the graphite lattice direction most nearly parallel to the magnetic field.

An important feature of LCI is that the external field need not exert any direct influence on the building block at all; the field aligns the LC solvent, which through anchoring aligns the growing film. The only requirement is that nuclei exhibit planar, nonhomogeneous anchoring. This requirement is easily satisfied for most building blocks by a suitable choice of the LC solvent. As a consequence, LCI is compatible with a wide range of building blocks. Suitable building blocks include any molecule or particle that can undergo orientational ordering in a liquid crystal medium. Representative building blocks include small molecules; macromolecules; and particles, such as colloidal particles, carbon nanotubes and other fullerenes, fibers and whiskers composed of materials such as SiC and carbon, inorganic particles such as semiconductor and metallic clusters, microtubules, viral particles, nucleic acid polymers (DNA), and organic particles such as polystyrene spheres, among others.

There are more than 70,000 thermotropic LC compounds known, spanning a wide range of chemical properties and transition temperatures. This is important because the structure of crystals grown from solution usually depends upon the chemical characteristics of the solvent. Rational selection of the solvent's chemical properties therefore lends additional control over crystal packing, defect density, inclusions and other factors.

The preparation of a representative oriented material, an oriented film, is illustrated schematically in FIG. 1. Results from three representative systems are summarized in Table 1. The first entry in Table 1 represents the simplest implementation of the LCI method, in which the LC solvent and solute building block were identical.

TABLE 1

Representative LCI Systems.

Figure 5:
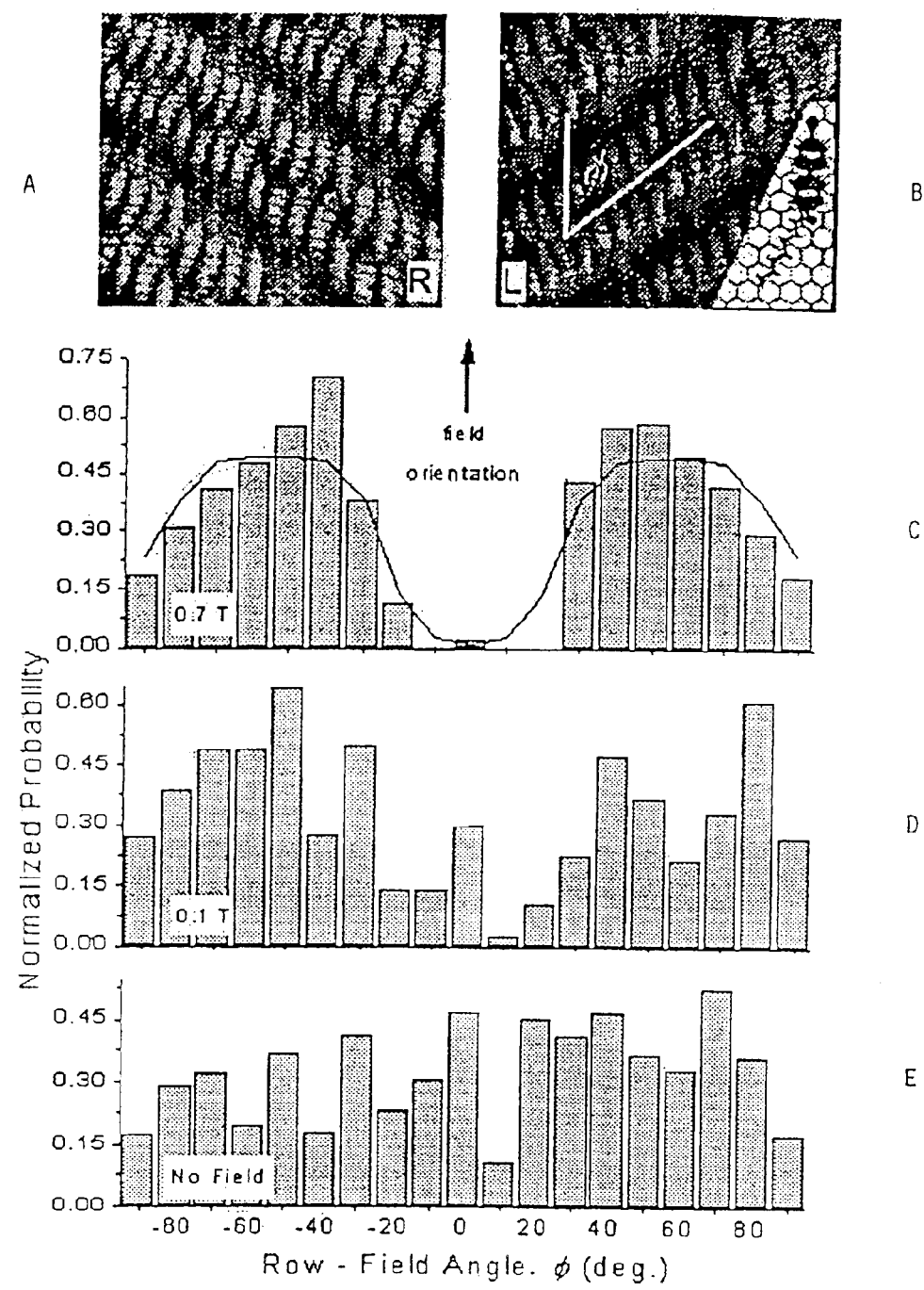
FIGS. 5A and 5B are STM images (9.5×8.0 nm) of a crystalline monolayer of 8CB on graphite with right (R)- and left (L)-handed domains formed at high field strength.
FIGS. 5C–5E are histograms illustrating 8CB distribution in monolayers on graphite, normalized probability is plotted versus row-field angle ($\phi$) in degrees for applied field strengths of 0.7 T, 0.1 T, and no field, respectively, the solid line in 5C is the predicted distribution.
Figure 7:
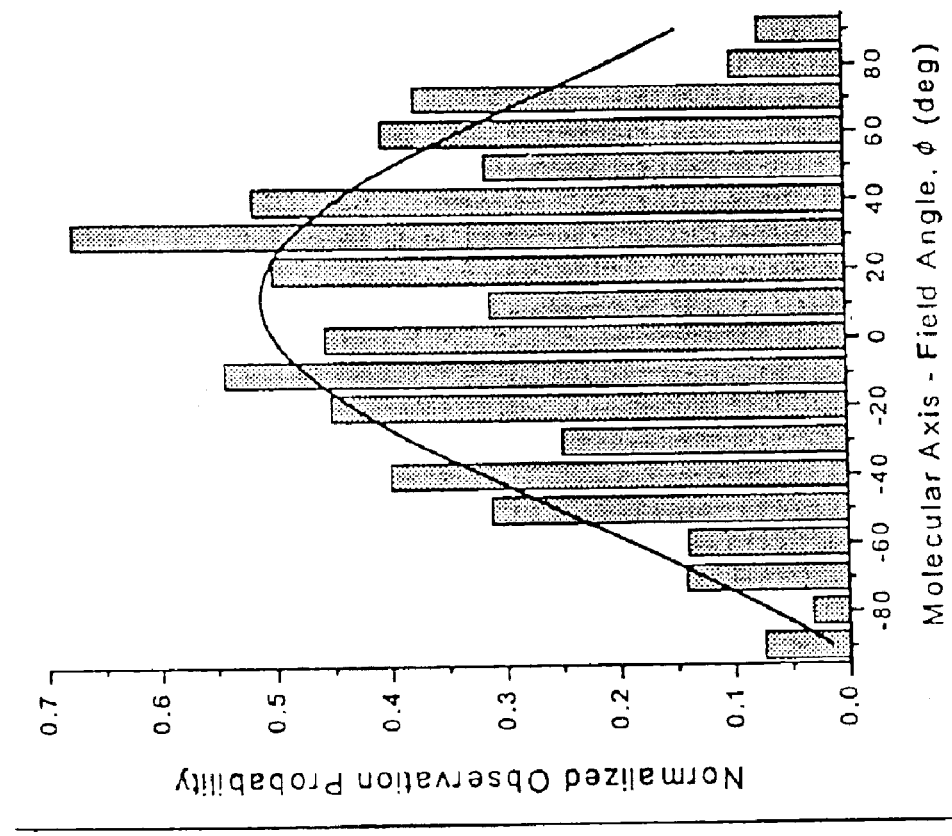
FIG. 7 is a histogram illustrating TA distribution in a film deposited on highly oriented pyrolytic graphite (HOPG) from LC ZLI-1565, normalized observation probability is plotted versus molecular axis-field angle ($\phi$) in degrees, the solid line is a guide to the eye with a fitted centroid at 12±5°.
Figure 6:
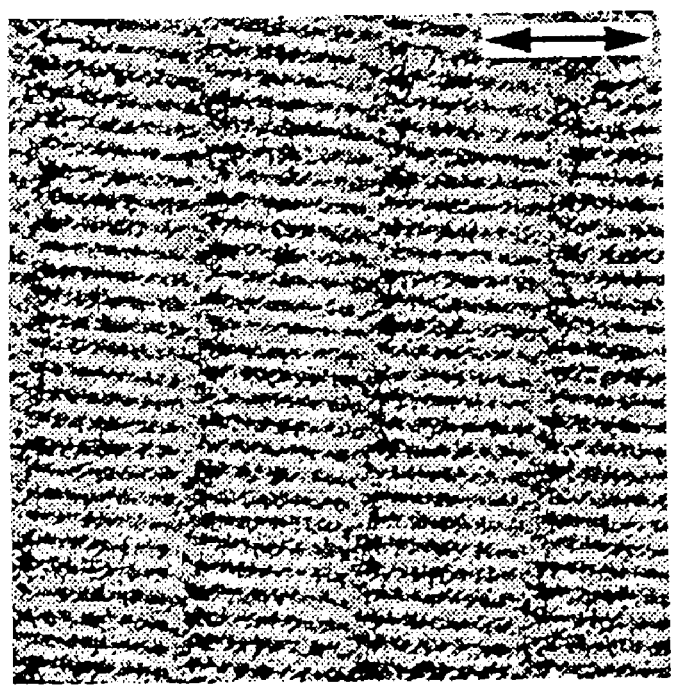
FIG. 6 is a STM image (10×10 nm) illustrating molecular alignment in a monolayer film of tetracosanoic acid (TA) on graphite, the arrow indicates the direction of the external field.

| LC solvent | Solute | Outcome | Comment |
| --- | --- | --- | --- |
| 4'-octyl-4-cyanobiphenyl (8CB) | 8CB | Uniformly aligned monolayer | See FIG. 5. |
| ZLI-1565 | n-tetracosanoic acid | Uniformly aligned monolayer | See FIGS. 6 and 7. |
| 4'-pentyl-4-cyanobiphenyl (5CB) | n-tetracosanoic acid | Randomly aligned monolayer | The monolayer crystallizes above $T_{N \to 1}$ when the LC is isotropic, and thus was randomly oriented. |

Figure 3:
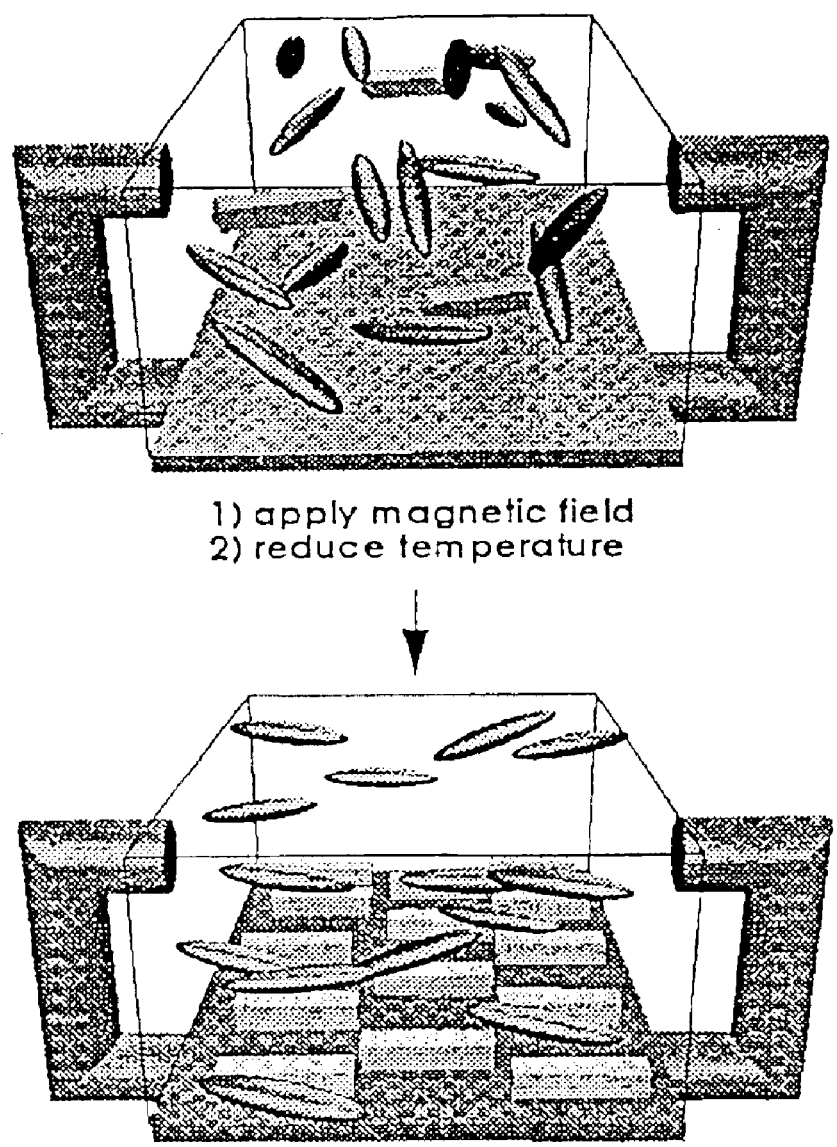
FIG. 3 is a schematic illustration of a method for forming an oriented material.

Representative monolayer organic films were prepared in accordance with the present invention by depositing solutes onto graphite substrates from different LC solvent/molecular solute combinations using both nematic and smectic LCs. Two representative systems include: (1) n-tetracosanoic acid (TA) deposited from the nematic LC ZLI-1565 (commercially available from Merck KGaA, Darmstadt, Germany) (0.3% by weight); and (2) 4'-octyl-4-cyanobiphenyl (8CB) deposited from a neat fluid. 8CB is a room-temperature smectic-A LC. The second system represents the simplest implementation of the method, in which the LC solvent and solute were identical. Films of TA and 8CB were deposited onto substrates of highly oriented pyrolytic graphite (HOPG ZYH grade, Advanced Ceramics, Inc.) measuring ~1 cm, which were deeply immersed (>2 mm) in a reservoir of LC/solute mixture. Each system was heated to ~100 C, then gradually cooled to room temperature in a magnetic field oriented parallel to the substrate plane (see FIG. 3). In both systems, a single polycrystalline monolayer formed at the graphite interface in contact with the bulk LC solvent. After cooling, samples were removed from the field and analyzed with scanning tunneling microscopy (STM). The STM tip penetrated through the LC fluid to image molecules in the monolayer at the graphite interface.

Figure 4:
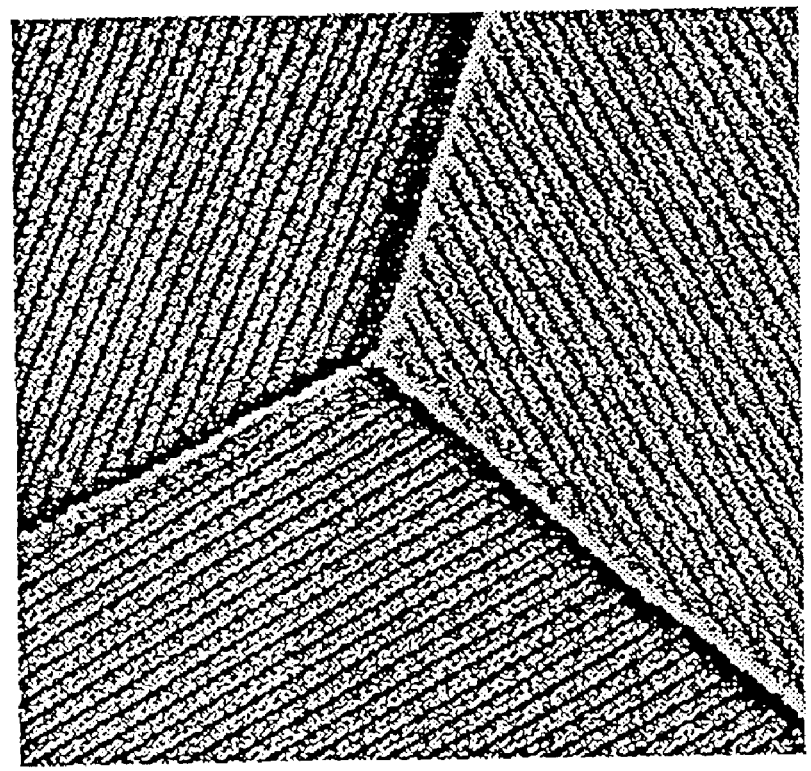
FIG. 4 is a scanning tunneling microscopic (STM) image (111×111 nm) of crystalline rows of 4'-octyl-4-cyanobiphenyl (8CB) on a graphite substrate prepared in the absence of a magnetic field, domain orientation is random.

Both 8CB and TA adsorb strongly on graphite, forming commensurate domains oriented along one of three symmetric directions separated by 120°. In the absence of an external influence causing alignment of the LC medium, these three directions are energetically equivalent. Because the crystallographic orientation of the substrate varied over micron length scales, samples prepared with no external influence causing alignment of the LC medium developed macroscopically random orientation. 8CB forms an epitaxial, polycrystalline monolayer on graphite. A STM image showing crystalline rows of 8CB on a graphite substrate is illustrated in FIG. 4. Individual domains orient in a discrete set of six energetically-equivalent directions determined by the symmetry of the substrate and registry of the molecules. However, this symmetry was broken for films deposited within a magnetic field, leading to macroscopically uniaxial order. To measure this uniaxial order, the orientation of adsorbed molecules was assessed at approximately 200 widely spaced locations across several samples using STM.

FIG. 7 presents a histogram showing the experimental distribution (shaded bars) of TA alignment measured for several films prepared in a 12.6 kG field. These films displayed macroscopically uniaxial order controlled by the external field-nematic order has been imprinted on the monolayer. The mean angle between the long molecular axis and the field was $\phi_o=12\pm5$; the STM image (FIG. 6) shows the most probable domain orientation. To normalize for micron-scale variations in local substrate orientation, we plot $P(\phi)=N(\phi)/[N(\phi)+N(\phi+120)+N(\phi-120)]$, where $N(\phi)$ is the number of domains in which the long molecular axis oriented at an angle N with respect to the field. This procedure corrects for statistical undersampling associated with making measurements at a finite number of surface locations and also eliminates any systematic orientational bias which would occur if the distribution of local substrate orientations included in the sampling was not truly random.

In 8CB monolayers, the long molecular axis also oriented approximately parallel to the field. However, in this case the distribution is bimodal, because we have plotted the angle between the molecular rows and the field, rather than the angle involving the molecular axis (see FIGS. 5A and 5B). For 8CB, row orientation is a more convenient descriptor of overall alignment than the orientation of individual molecules, since each molecular axis in the unit cell points in a slightly different direction, and because the 8CB monolayer is chiral. Chirality develops as a result of molecular adsorption, when rotation about the C—C bond linking the cyanobiphenyl headgroup to the alkyl tail group is quenched. This gives the molecule a bow shape, and hence chirality in two dimensions. STM images of left- and right-chiral domains are shown in FIGS. 5A and 5B. Because the molecular axis forms an angle of approximately ±30° to the rows, and because the sign of this angle depends on domain chirality, there were two favored row orientations, $\phi_o=\pm(54.6\pm8.6°)$ with respect to the field. When rows oriented in these directions, the molecular axis was essentially parallel to the field.

FIG. 5C shows the experimental distribution of 8CB row alignment in a 7.2 kG field (0.7 T). Films prepared at other field strengths from 1.2 to 13 kG resulted in an improvement in the quality of orientational order with increasing field strength, reaching a limit above ~2 kG. FIGS. 5D and 5E show the experimental distribution of 8CB row alignment at 0.1 T and no field, respectively. Alignment showed little additional improvement above this threshold, because adsorbates almost always chose the local substrate vector making the row-field angle as close as possible to ±54.6°, while maintaining substrate registry. Films prepared in the absence of a field showed random macroscopic orientational order. See, e.g., FIG. 4.

The 8CB monolayer began to crystallize at 27–29° C., after the bulk LC had cooled to the smectic-A phase. The TA monolayer crystallized at 30–40° C., near the center of ZLI-1565's nematic range, based on the behavior of related aliphatic adsorbates on graphite. Because the substrates were immersed in LC solutions at ~100° C., molecules initially adsorbed in a thermally disordered state (i.e., they did not adsorb prealigned). Furthermore, the orientation of an aligned film could not be altered by placing it back in the field at a different orientation, unless the temperature was raised above the monolayer melting point. Thus, molecular alignment originated after adsorption, but during an early stage of film growth, when molecules were forming small crystalline aggregates. Once the number of molecules in an aggregate grew beyond a critical value N, aggregate rotation was no longer possible and orientation was fixed.

From these observations, a simple model can be constructed for communication of orientational order to the developing film. There are three factors influencing adsorbate orientation: (1) interaction with the substrate, (2) direct interaction with the external field, and (3) interaction with the LC fluid. The orientational energy of an adsorbate can be written as a sum of these contributions, $$E_{orientation}(\phi)=E_{substrate}+E_{field}+E_{fluid}.$$

The first term represents adsorbate-substrate interactions, which have by far the strongest influence. At the maximum field strength produced by a magnet (13 kG), molecules in both films remained commensurate with the substrate, and the detailed structure of the unit cell was identical to samples prepared with no field. The magnetic field's influence was therefore limited to breaking the threefold orientational degeneracy of the substrate, causing domains to select the local substrate direction that allowed molecules to most nearly align in the preferred direction.

A calculation of the second term, direct interaction of adsorbed molecules with the external field, showed that it was insignificant. 8CB's biphenyl moiety results in stronger anisotropic interactions with a magnetic field than TA, but these interactions are nonetheless very weak. The energetic cost of misaligning an entire domain of m molecules by 90° in a field of strength H is $E_{field}=mw\Delta_\chi H^2/2$, where $\Delta_\chi$ is the mass magnetic susceptibility anisotropy and w is the molecular weight. The grade of HOPG used in this work resulted in an average adlayer domain size $~1\,\mu m^2$, or $m~10^6$ molecules, so for 8CB, $E_{field}\leq 10^{-2}$ kT per domain in a 7.2 kG field at 28° C. This energy is at least 2 orders of magnitude too small to account for the statistical excess of favored orientations in FIGS. 5–7.

It is the third factor-interaction between aggregates of adsorbed molecules and the LC fluid above them-that produces alignment in these films. While surface-induced ordering of LCs is a well-known and technologically important phenomenon, the reverse process, i.e., LC-induced surface ordering, has not to our knowledge been previously described. As is the case for surface-induced bulk alignment, adlayer alignment arises from the LC's anisotropic surface tension, which causes the director to adopt a preferred orientation ("anchor") at an interface. In representative systems, the LCs underwent planar anchoring, meaning the director oriented parallel to the surface, along a preferred azimuthal direction. If an aggregate's easy axis does not coincide with the bulk director orientation imposed by the field, the free energy of the system (aggregate+interfacial fluid) increases by an amount proportional to this mismatch. Although the field strengths used here had little direct influence on monolayer alignment, they were sufficient to align the bulk solvent, where macroscopic numbers of molecules act collectively. This was confirmed this using polarizing optical microscopy. The following treatment of these anisotropic fluid-adlayer interactions qualitatively accounts for the observed alignment phenomena.

In a nematic solvent, excess free energy arises primarily from a twist distortion in the director field above misaligned aggregates. By twisting, the LC balances the alignment torque exerted by the field with restoring torque from curvature elasticity and surface anchoring. The twist distortion extends a distance $d=H^{-1}(K_{22}\Delta_\chi)^{1/2} \sim 1-10$ $\mu$m into the bulk, after which the director orients parallel to the field. Here $K_{22}$ is the twist elastic constant. The interdomain orientational interactions in 8CB films mediated by an interfacial LC fluid extend less than 0.25 $\mu$m laterally, which is less than the average terrace size. Thus, only isolated aggregates are considered. In the limit of strong anchoring (anchoring energy$>>H(K_{22}\Delta_\chi)^{1/2} \sim 10^{-6}$ Jm$^{-2}$), the elastic torque exerted on each aggregate by the solvent has a particularly simple form: $\tau = -NaH(K_{22}\Delta_\chi)^{1/2} \sin(\phi_0-\phi)$, where a is the area per molecule in the crystalline film. If the condition for strong anchoring is not satisfied, the director rotates at the interface, somewhat reducing the torque exerted on the aggregate. The free energy cost of aggregate misalignment is found by integrating the torque through the misalignment angle: $E_{nematic\ fluid} = -NaH(K_{22}\Delta_\chi)^{1/2} \cos(\phi_0-\phi)$, where for TA, $\phi_o = 12°$.

In a smectic solvent, twist distortions are formally disallowed due to interlayer incompressibility. Therefore in the limit of high field strength, the director remains approximately parallel to the external field right down to the surface. In this case, the excess free energy of aggregate misalignment arises from a mismatch between the director orientation at the surface and the aggregate's anchoring direction. This energy is often modeled with the Rapini-Papoular potential [14]: $E_{smectic\ fluid} = NaW/2 \sin^2(\phi_0-\phi)$, where W is the anchoring energy, and for 8CB, $\phi_o = \pm 54.6°$.

Using these expressions for $E_{fluid}$, the orientational distribution of an ensemble of aggregates can be calculated assuming the film develops in thermal equilibrium. The probability $P(\phi) = Q^{-1} \exp[-E_{fluid}(\phi)/kT]$, where T is the temperature of monolayer formation, the partition function $Q = \Sigma_\phi \exp[-E_{fluid}(\phi)/kT]$, k is Boltzmann's constant, and $\phi$ is restricted to orientations consistent with local substrate registry due to overwhelming adsorbate-substrate interactions.

These expressions were used to separately fit the distributions in FIGS. 5 and 7 to find the aggregate size N that described each system best. For the anchoring energy of 8CB, W=5×10$^{-5}$ J m$^{-2}$, was chosen as a typical value on crystalline surfaces. The fitting procedure yielded $N_{TA} = 2\pm2 \times$ 10$^3$ and $N_{8CB} = 6-7\times10^2$ molecules, with the calculated distributions shown as solid lines in FIGS. 5C and 7.

The single-molecule alignment energy $E_{fluid}/N << kT$ at the crystallization temperature. Therefore, only adsorbates that are members of a crystalline aggregate—and hence act collectively—can possess significant uniaxial alignment. The aggregate size N is much smaller than the average domain size m in the fully developed film, the latter being of the order $m \cong 10^6$ molecules. This is consistent with the observation that film orientation cannot be altered by replacing an aligned sample in the field at a different orientation; the aggregates have grown too large to rotate. Rotation presents an energetic barrier that increases rapidly with aggregate size, because it entails a transition through an incommensurate state. The orientational statistics measured from fully developed films thus reflect the alignment distribution during the early stages of film formation, because large aggregates cannot overcome the rotational activation barrier on experimental time scales.

Even in the strongest field, the maximum energy cost of aggregate misalignment is only a small fraction of the thermodynamic driving force for nucleation. With 8CB, for example, the ratio of these two energies was calculated to be about 0.1% at 28° C. This explains why the detailed arrangement of molecules within the unit cell is unchanged from films prepared outside the field. The field selects among degenerate aggregate orientations, but does not significantly perturb adsorbate-substrate or adsorbate-adsorbate interactions.

In a further aspect, the invention provides methods for using and devices that include the oriented materials formed in accordance with the present invention.

Composite Films with Selective Alignment. Representative composite films of the invention include bicomponent thin films in which one component is uniformly aligned while the other is randomly (or partially) oriented. Composite materials consisting of a mixture of ordered and disordered phases can exhibit useful combinations of physical, optical, and other properties. For example, the combination of hardness and toughness possessed by materials such as tooth enamel and mollusk shells results from combining oriented inorganic microcrystals with a disordered biopolymer matrix. The degree of LC-induced alignment in thin films can be remarkably sensitive to the chemical nature of the building block. For example, films of the alkane n-tetracontane ($C_{40}H_{82}$) resist alignment in most LCs. However, by replacing one terminal methyl group with a more polar moiety such as a carboxylic acid, unidirectional alignment is readily achieved.

The present invention further provides composites (i.e., multicomponent films) in which the orientational order of each component is individually controlled. One potential application of this kind of multi-component, selectively oriented film is as a template onto which additional material could be epitaxially deposited to produce a three-dimensional composite with tailored microstructural order.

Figure 8:
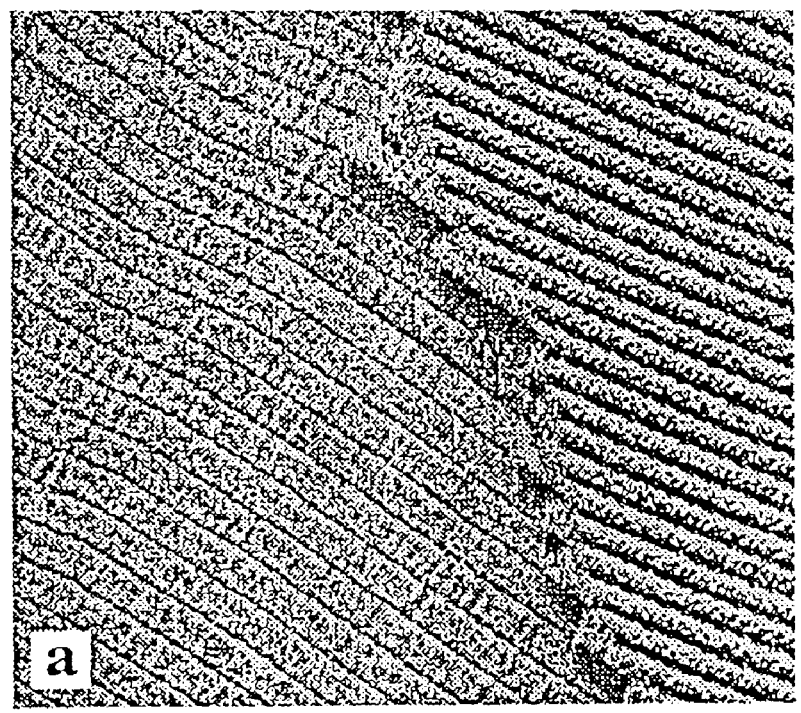
FIG. 8 is a STM image (90×88 nm) an 8CB/n-tetracontane domain boundary in a mixed film, 8CB is on the right.

Representative systems include the binary mixture 8CB/n-tetracontane and the ternary mixture ZLI-1565/tetracosanoic acid/n-tetracontane. The first of these two systems forms monolayers with mixed composition when the mole fraction of the alkane is ~1/600 (FIG. 8). Variations in concentration around this value change the monolayer composition. Although 8CB can be aligned, tetracontane deposited from 8CB is not aligned. In the second system, both building blocks-differ from the LC solvent itself. In pure films grown from ZLI-1565, the fatty acid is aligned, while the alkane is not.

Oriented-Films as Rewriteable Anchoring Layers. Once orientational order has been imprinted on a thin film using LCI, the film can be used as an anchoring layer to control director alignment in a LC cell. In fact, if a surface is sufficiently flat, a singly molecular monolayer can control director alignment throughout the entire thickness of a LC cell (hundreds of microns). Anchoring layers are a key part of most LC devices, and therefore a great deal of effort has been expended toward developing improved thin film materials and processing techniques to induce strong anchoring in a preferred direction. The most widely-used approach for planar anchoring is to mechanically rub a polymer film (often polyimide), introducing grooves that align the LC director in a parallel direction. This method has certain disadvantages, including build up of static charge and generation of small wear particles that must be removed prior to component assembly. The anchoring induced by rubbing is also permanent, which makes it incompatible for use in LC-based information storage devices and some other applications. Uniformly oriented anchoring layers prepared by the LCI process of the present invention can offer advantages over present methods. These include simplified device fabrication by elimination of steps involving spin coating, rubbing, curing, and other alignment layer preparation procedures. The alignment layer could even be formed in situ, after device assembly, by melting and recrystallizing the monolayer in an alignment field. The anchoring direction can be altered as needed—with high spatial resolution—by local melting and recrystallization. Thus, anchoring films prepared by the LCI process of the invention are rewriteable.

Figure 9:
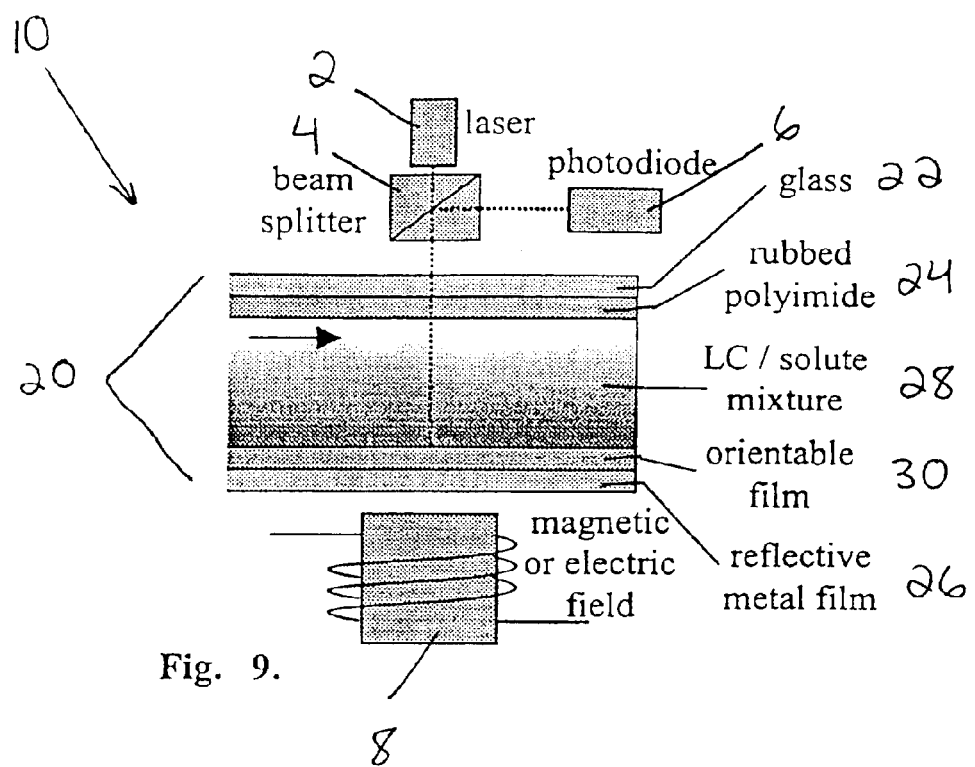
FIG. 9 is a representative hybrid LC-based magneto-optical phase-change memory device.

Rewriteable anchoring films have a number of potential uses. If a laser is used to locally melt the film followed by recrystallization under the action of an external alignment field, the local orientation can be varied as desired. Patterned films can then be used to control anchoring in a LC cell, with various applications in photonics. These range from generation of complex patterns for use as waveguides, diffraction gratings and holograms to high density information storage devices, to wide viewing angle LC displays. Alternatively, patterned films could serve as templates upon which additional building blocks could be deposited to form a 3-dimensional material. Few methods have been developed for patterning anchoring films with small-scale features, and none of the methods is rewriteable. A representative device, a hybrid LC-based magneto-optical phase-change memory device, utilizing an oriented material formed in accordance with the present invention is illustrated in FIG. 9. The device in FIG. 9 illustrates how LCI can be used for information storage.

Referring to FIG. 9, device 10 includes laser 2, beamsplitter 4, photodiode 6, external field generator 8, and cell assembly 20. Assembly 20 includes sequentially glass layer 22, rubbed polyimide layer 24, and reflective metal film layer 26. Intermediate rubbed polyimide layer 24 and reflective metal film layer 26 is LC/solute mixture 28 and orientable film 30. Oriented film 30 lies adjacent metal film 26 with LC/solute mixture 28 intermediate oriented film 30 and rubbed polyimide layer 24.

Information is read and written as follows. To record a bit, laser power is increased to locally melt the orientable film. Upon cooling, the film crystallizes with an orientation parallel to the LC director above the melted region. When the external field is off, the director is established by the rubbing direction of the polyimide layer (see arrow). In this case, the orientable film aligns parallel to the arrow and the anchoring direction is the same at the upper and lower interfaces of the cell. The director is therefore uniformly aligned throughout and the reflected light (read with reduced laser intensity) is strong. When the orientable film crystallizes with the field on, a bit is erased. In this case, the magnet aligns the director perpendicular to the orientable film and so it crystallizes with a random orientation. After crystallization, anchoring at the orientable film thus differs from that at the polyimide layer, causing local director distortions. These distortions scatter laser light causing reduced reflected signal intensity.

Figure 10:
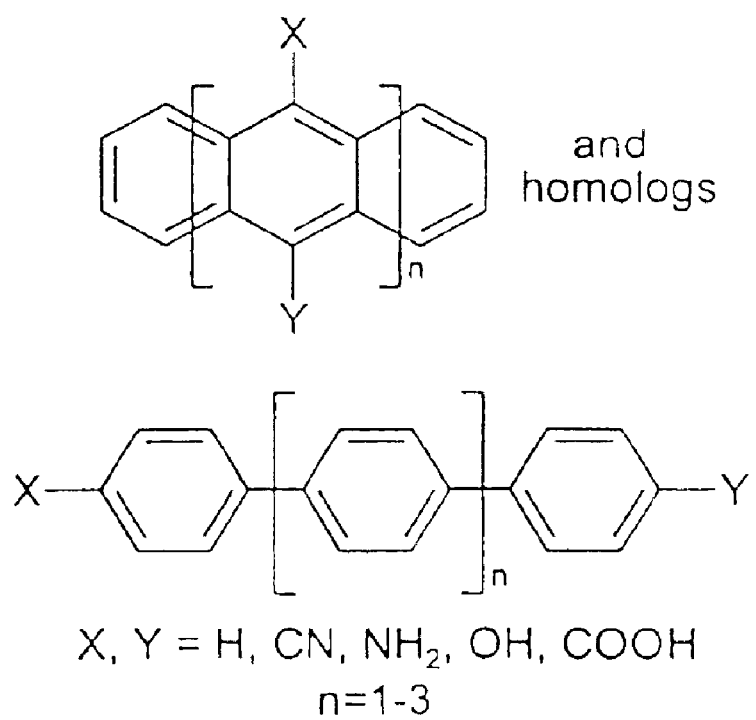
FIG. 10 illustrates compounds useful in rewriteable anchoring films.

Monolayer films of polyaromatic hydrocarbons (PAH) and PAHs with polar functional groups on atomically-flat Au(111) are viewed as suitable solutes for this, application (see FIG. 10). Gold is a suitable substrate because of its chemical inertness, high optical reflectivity, and excellent thermal conductivity. Thin, optically transparent Au(111) films vacuum deposited on mica can be used so that systems can be examined with transmission polarizing microscopy.

PAH molecules possess several characteristics making them suitable for use as rewriteable anchoring films. First, their compact size and conformational rigidity result in high diffusion and crystallization rates, important for fast write/erase operation. Second, varying the number of rings in the central core and the nature and number of polar side groups affects the adsorption energy, offering a way to tailor the film's melting point, and to ensure selective adsorption of the solute. Suitable films have melting points between 60–70° C., which is well above ambient temperature, but within the nematic range of many LC mixtures and easily achieved with a 5–10 mW focused diode laser. Each of these compounds is expected to reversibly physisorb on Au. Third, these same structural and chemical variables can also be tuned to optimize the anchoring energy, necessary for strong directional alignment. Finally, some of these compounds are used as dyes in dichroic LC displays and do not suffer from problems arising from chemical incompatibility or reactivity. These films need not possess fully crystalline (i.e. translational) order; all that is required is overall uniaxial orientational order.

Thin films of these compounds can be rapidly screened for their ability to form oriented monolayers by LCI along with determinations of their melting points. The procedure uses a LC optical cell with transparent Au films as inner windows. The cell is filled with the LC/solute mixture, placed in a magnetic field, and heated to a temperature above the melting point of the monolayer. Upon cooling a film forms at the Au/LC interface. To determine whether the film was uniformly aligned by this process, and if so, also its melting temperature, the cell is mounted on a variable-temperature microscope stage and gradually heated to progressively higher temperatures. During heating a much weaker magnetic field will be applied in a direction differing from that used to prepare the film. If the film was aligned during preparation, the LC director will resist reorientation under the action of this weak field, because it will be fixed by anchoring in its original direction. If the film was not aligned, or if the cell temperature exceeds the film's melting point, surface memory of the original alignment direction will be lost, and the weak field will reorient the LC. For slow heating rates, this event occurs abruptly, and can be observed in an optical microscope with crossed polarizers.

After a group of target compounds has been identified meeting the criteria for orientability and melting point range, molecular-scale film structure can be examined using STM. For film patterning with a focused laser, a polycrystalline morphology with small domain size is preferred. To achieve the highest spatial resolution, the average domain size should be smaller than the diffraction-limited laser spot size ($\sim 1\ \mu m^2$).

Localized changes in film alignment by heating with a focused laser diode in a strong magnetic field can be determined. These measurements involve determination of the laser power density, heating time, and magnetic field strength needed to cause local melting and imprinting of revised orientational order. To measure minimum feature size produced by the method of the invention, small (1–5 $\mu m^2$) surface regions can be irradiated at varying laser intensities for varying lengths of time. The effect on local film structure can be measured with STM, and quantified by computing a local orientational order parameter, S, based on a regional distribution of domain orientations. For a laser with uniform intensity across a circular illumination zone (the intensity profile will be separately calibrated), S varies radially, being smallest near the perimeter and reaching a maximum at the center. This is because molecules recrystallizing near the perimeter are immediately adjacent to unmelted film regions, so the local LC director is oriented by competing influences the external magnetic field and anchoring over the unmelted film. A related phenomenon has been reported using 'molecule corrals'. Analysis of the radial variance of the order parameter profile and its relationship to the strength of the magnetic field provides information useful for further optimization of the molecular building block.

Hierarchically Structured Materials From Particulate Building Blocks. The method of the invention can be used to prepare materials composed of oriented particles, as well as molecules. Particles can be dispersed in the LC and caused to precipitate upon the surface of the material with an orientation dictated by the LC fluid. The oriented particles may range in size from nanometers to microns. Using this procedure multiple layers can be laid down, each with the desired orientation, producing a film of arbitrary thickness. The orientation of particles in successive layers need not be the same. Examples of the types of particles that can be oriented include carbon nanotubes, and inorganic and biological whiskers and fibers.

The present invention provides a method for orienting solid crystals grown in contact with thermotropic liquid crystals. The advantage of LC alignment media is that orientation can be controlled by an external field or other alignment influence. Because alignment arises from adsorbate-LC fluid interactions, rather than from direct interaction between the adsorbate and the field, uniaxial films can be prepared from a variety of different building blocks deposited as layers from a LC solvent or suspension.

To summarize, the present invention provides oriented materials, including monolayer films of small molecules, formed by deposition of an ordered component from a LC solvent in an external influence causing alignment of the LC medium develop macroscopically-uniform orientational order, which can be controlled by the field strength and other factors.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A material produced by the process of depositing an oriented particle from an oriented liquid crystal medium onto a substrate.

2. The material of claim 1, wherein the material comprises a film.

3. The material of claim 1, wherein the material comprises a uniaxial particulate film.

4. The material of claim 1, wherein the material comprises a monolayer film.

5. A material comprising at least one oriented layer, wherein the oriented layer is formed by depositing an oriented particle from an oriented liquid crystal medium.

6. The material of claim 5, wherein the material comprises a film.

7. The material of claim 5, wherein the material comprises a uniaxial particulate film.

8. A multilayered material comprising at least one oriented layer, wherein the oriented layer is formed by depositing an oriented component from an oriented liquid crystal medium.

9. The material of claim 8, wherein the component comprises an organic molecule.

10. The material of claim 8, wherein the component comprises a particle.

11. The material of claim 1, wherein the particle comprises a carbon nanotube.

12. The material of claim 1, wherein the particle is at least one of a fiber or a whisker.

13. The material of claim 1, wherein the particle comprises an inorganic particle.

14. The material of claim 1, wherein the particle comprises a microtubule.

15. The material of claim 1, wherein the particle comprises a viral particle.

16. The material of claim 1, wherein the particle comprises a nucleic acid polymer.

17. The material of claim 1, wherein the particle comprises an organic particle.

18. An oriented material having at least two layers, comprising:
   a substrate;
   a first oriented layer comprising a first oriented component, wherein the first layer is formed by depositing the first oriented component from a first oriented liquid crystal medium onto the substrate; and
   a second oriented layer comprising a second oriented component, wherein the second layer is formed by depositing the second oriented component from a second oriented liquid crystal medium onto the first oriented layer;
   wherein the first oriented layer is intermediate the substrate and second oriented layer.

19. The material of claim 18, wherein the oriented material comprises a film.

20. The material of claim 18, wherein at least one of the first or second oriented components comprises an organic molecule.

21. The material of claim 18, wherein at least one of the first or second oriented components comprises a particle.

22. The material of claim 18, wherein the first oriented component has an orientation that is the same as the second oriented component.

23. The material of claim 18, wherein the first oriented component has an orientation that is different from the second oriented component.

24. An oriented material having at least two layers, comprising:
   a substrate;
   a first oriented layer comprising a first oriented component, wherein the first layer is formed by depositing the first oriented component from a first oriented liquid crystal medium onto the substrate; and
   a second layer comprising a second component, wherein the second layer is formed by depositing the second component from a second oriented liquid crystal medium onto the substrate;

wherein the first oriented layer is intermediate the substrate and second layer.

25. The material of claim 24, wherein the second component is randomly oriented.

26. The material of claim 24, wherein at least one of the first or second components comprises an organic molecule.

27. The material of claim 24, wherein at least one of the first or second components comprises a particle.

28. An oriented material having at least two layers, comprising:

a substrate;

a first layer comprising a first component, wherein the first layer is formed by depositing the first component from a first liquid crystal medium onto the substrate; and a second oriented layer comprising a second oriented component, wherein the second layer is formed by depositing the second oriented component from a second oriented liquid crystal medium onto the substrate;

wherein the first layer is intermediate the substrate and second oriented layer.

29. The material of claim 28, wherein the first component is randomly oriented.

30. The material of claim 28, wherein at least one of the first or second components comprises an organic molecule.

31. The material of claim 28, wherein at least one of the first or second components comprises a particle.

32. A material having a plurality of layers, at least one of the layers being an oriented layer, comprising:

a substrate; and a plurality of layers, wherein at least one of the layers is an oriented layer comprising an oriented component, wherein the oriented layer is formed by depositing the oriented component from an oriented liquid crystal medium onto the substrate.

33. The material of claim 32, wherein the oriented component comprises an organic molecule.

34. The material of claim 32, wherein the oriented component comprises a particle.

* * * * *